(12) United States Patent
Moreau et al.

(10) Patent No.: US 8,756,771 B1
(45) Date of Patent: Jun. 24, 2014

(54) LOCKING CLIP ASSEMBLY

(71) Applicants: Darrell A. Moreau, Manchester, NH (US); Andre W. Moreau, Spring Hill, FL (US)

(72) Inventors: Darrell A. Moreau, Manchester, NH (US); Andre W. Moreau, Spring Hill, FL (US)

(73) Assignee: Ty-Flot, Inc., Manchester, NH (US)

( * ) Notice: Subject to any disclaimer, the term of this patent is extended or adjusted under 35 U.S.C. 154(b) by 0 days.

(21) Appl. No.: 13/741,623

(22) Filed: Jan. 15, 2013

Related U.S. Application Data

(63) Continuation-in-part of application No. 29/440,714, filed on Dec. 26, 2012, now Pat. No. Des. 698,223.

(51) Int. Cl.
*A44B 11/06* (2006.01)
*F16B 2/10* (2006.01)
*E05B 65/00* (2006.01)

(52) U.S. Cl.
USPC ............................................. 24/517; 24/537

(58) Field of Classification Search
USPC ................... 24/492, 505, 507, 517, 518, 519, 24/265 EC, 542, 527, 461, 489, 520, 564, 24/571, 499, 506, 513, 530, 535, 536, 537, 24/543
See application file for complete search history.

(56) References Cited

U.S. PATENT DOCUMENTS

| | | | | |
|---|---|---|---|---|
| 124,071 | A | * 2/1872 | Lipsey | ............................ 24/537 |
| 717,367 | A | 12/1902 | Ellis | |
| 1,274,006 | A | 7/1918 | Clarke et al. | |
| 1,881,442 | A | 10/1932 | Fisher et al. | |
| 2,173,010 | A | 9/1939 | De Amario | |
| 2,456,409 | A | 12/1948 | Grewe | |
| 3,137,027 | A | * 6/1964 | Birkle | ............................ 16/87.2 |
| 3,235,928 | A | * 2/1966 | Clark | ............................... 24/517 |
| 3,924,303 | A | * 12/1975 | Elliott | ............................. 24/537 |
| 3,950,829 | A | * 4/1976 | Cohen | ............................ 211/124 |
| 4,813,107 | A | 3/1989 | Cetrone | |
| 5,402,558 | A | 4/1995 | Santapa | |
| 5,732,921 | A | 3/1998 | Lemire | |
| 7,152,284 | B1 * | 12/2006 | Greer et al. | ..................... 24/537 |
| 7,243,402 | B2 | 7/2007 | Andersen et al. | |

* cited by examiner

*Primary Examiner* — Robert J Sandy
*Assistant Examiner* — Abigail Morrell
(74) *Attorney, Agent, or Firm* — Robert R. Deleault, Esq.; Mesmer & Deleault, PLLC

(57) ABSTRACT

A locking clip assembly includes a clip body with a body clamping end, a rear portion and a body hinge portion between the body clamping end and the rear portion, an elongated arm member having a jaw portion, a lever arm portion and an arm hinge portion pivotally connected to the body hinge portion, and a locking member slidably disposed on the rear portion of the clip body where the locking member is movable between an arm member locked position and an arm member unlocked position.

20 Claims, 7 Drawing Sheets

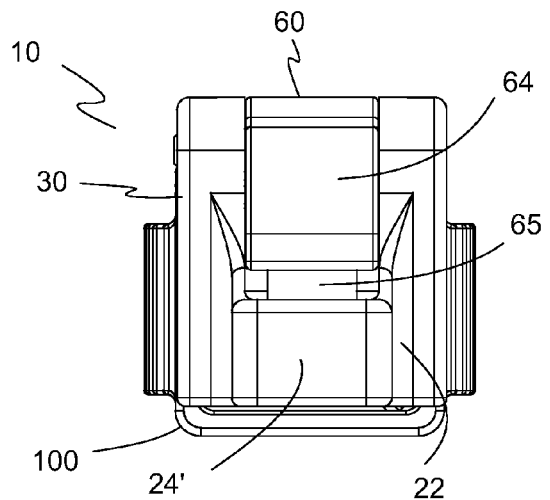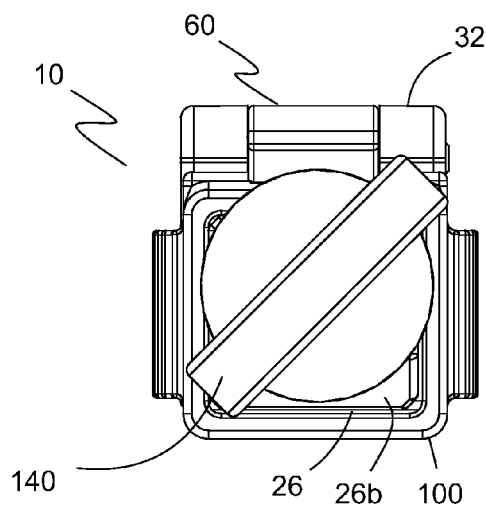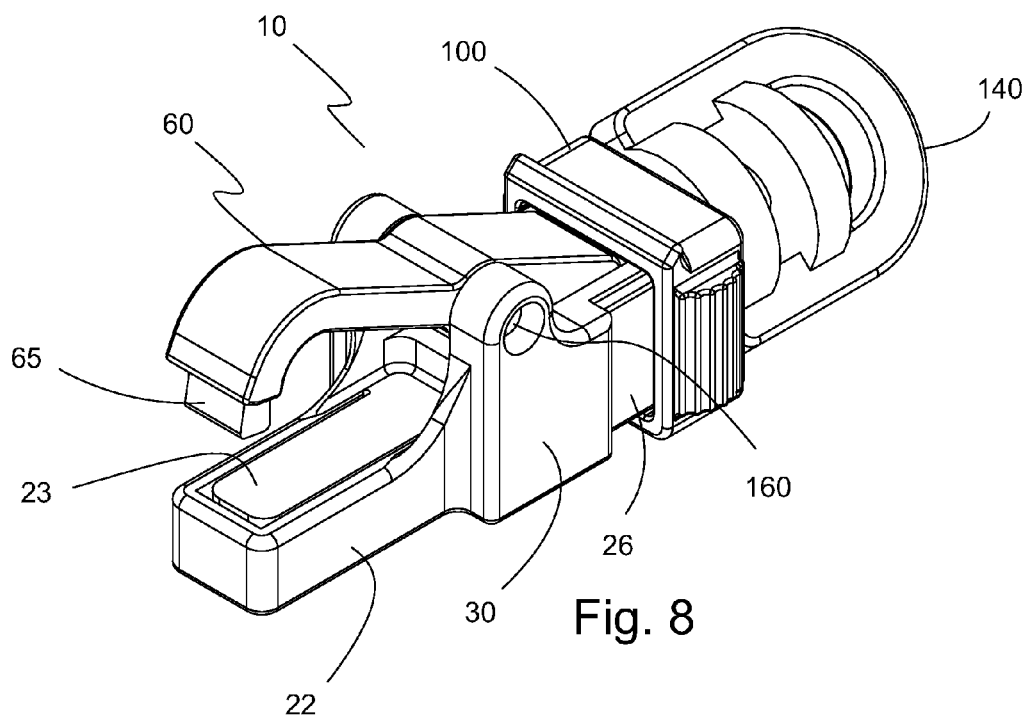

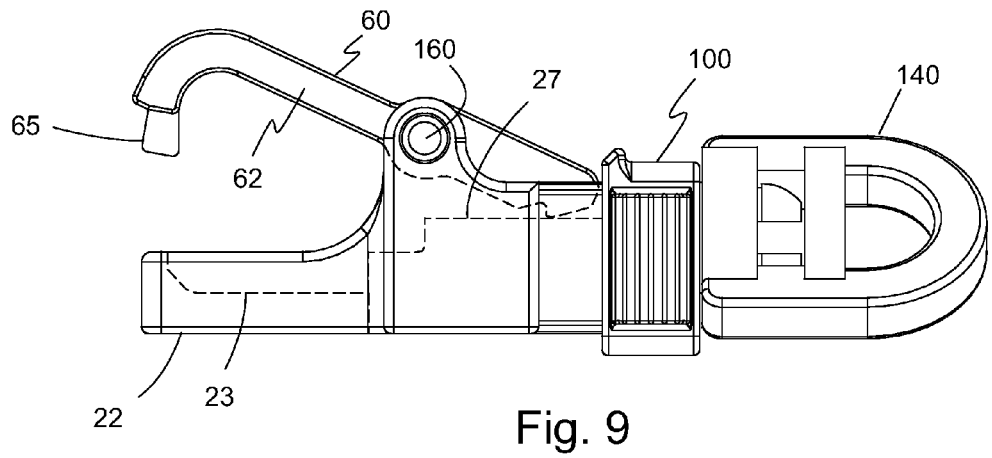
Fig. 9
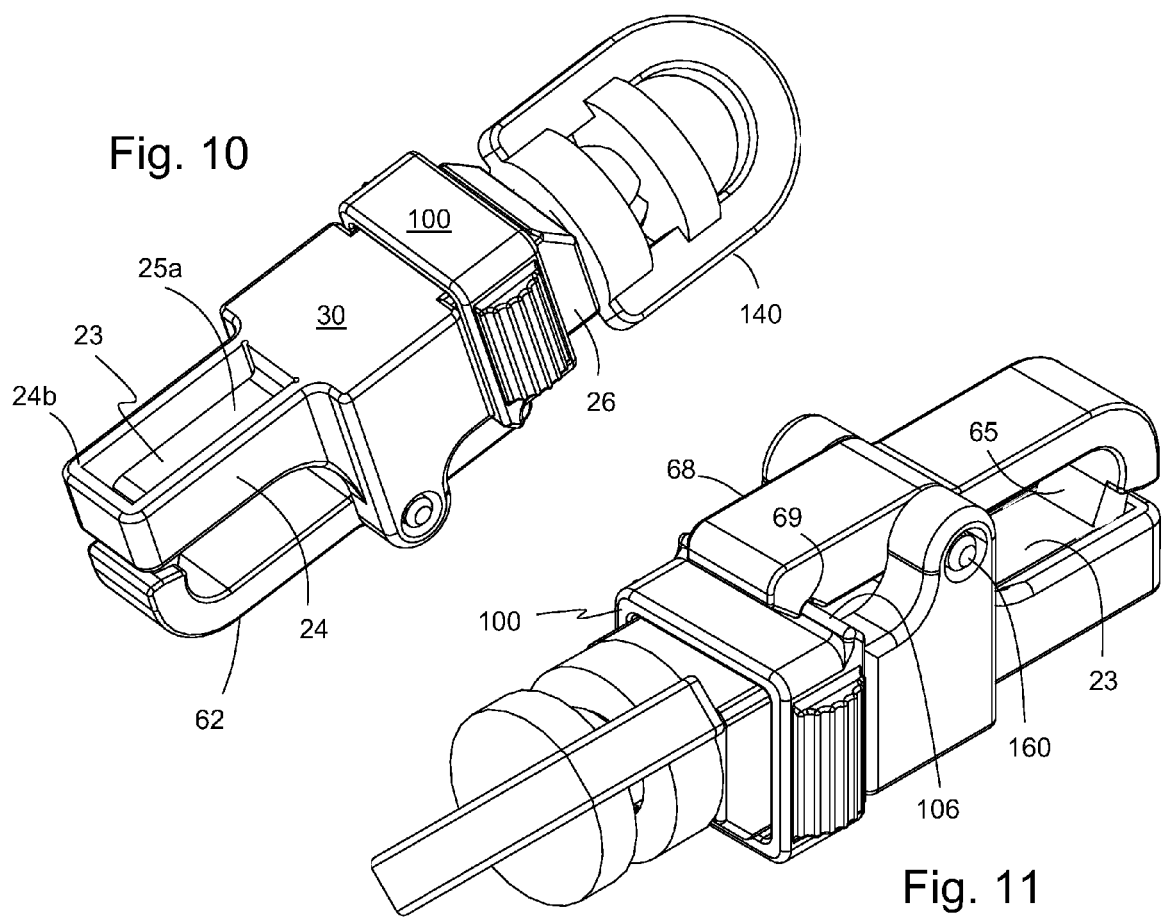
Fig. 10
Fig. 11

LOCKING CLIP ASSEMBLY

This application is a continuation-in-part application of Ser. No. 29/440,714 filed on Dec. 26, 2012.

BACKGROUND OF THE INVENTION

1. Field of the Invention

The present invention relates generally to clips. Particularly, the present invention relates to a locking clip assembly.

2. Description of the Prior Art

Clip-type structures have been around for a long time. Ever since there was a need to connect two articles together, clips of various designs have been constructed. The most basic of clip designs is the paper clip, which is designed to hold two or more pieces of paper together without puncturing the surface of the paper.

There have been devised resilient clips, locking clips, spring clips, clips for garters, clips for suspenders, rug holder clips, clips for fabric, clips for canvas tarps or plastic sheets, clips for clothes hangers, and the like. Locking clips are a special category of clips that typically include a means for maintaining a clip in a locked position.

In one type of locking clip, two jaw members pivot relative to each other about a pivot axis. On one side of the pivot axis is a pair of jaws in opposed relationship to each other. On the other side of the pivot axis are the lever handles of the two jaw members. When the lever handles are squeezed toward each other, the jaws open. On one of the lever handles is positioned a clip structure spaced from the pivot axis. Pivotally connected to the clip structure is a locking member that is pivoted to capture the other lever handle and maintain the pair of lever handles at a relatively fixed, spaced position until the locking member is pivotally removed from its locking position.

Another type of locking clip is a clasp having a front member and a back member. The back member has one end formed into a tongue that is bent inwardly and rearwardly to present an inwardly directed hook. A slide is fitted on the front member and is configured to slide toward the tongue and to capture the tongue of the back member to the front member and to lock the front member to the back member until the slide is disengaged. The tongue and the front member at the point of capture by the slide are the "jaws" that hold the fabric placed between the front member and the back member.

A locking rug holder is another type of clip that has two arms. One is a long arm with a J-shaped member and the other is a swinging arm hingedly connected to the short arm of the J-shaped member. The ends opposite the J-shaped member of each of the long arm and the swinging arm include rubber pads in opposed relationship to each other. Each arm has a plurality of corrugations on its outer surface that extends between the J-shaped member and the rubber pads. A rectangular loop member has cross arms where each cross arm is provided with a roller for engaging the corrugations of the long arm and the swinging arm. In use, a portion of a rug is placed between the rubber pads and the loop member is forced forward toward the end with the rubber pads so that the rollers engage the corrugations thereby holding the long arm and the swinging arm together.

There is also a clip assembly that includes two gripping members that include jaws and arms that are joined by a pivot connection so that the jaws are forced into engagement when the arms are pressed together. A first arm is typically rectangular with an elongated slot. The second arm is made of a resilient material so that the arm bends as the jaws are forced into gripping engagement. There is a hook or other attachment portion on a terminal end of the second arm such that the hook is received through the elongated slot of the first arm thereby permitting the attachment of a rope or cord or the like to the hook after the hook is bent through the slot, thus preventing the arms from separating out of the forced gripping engagement.

SUMMARY OF THE INVENTION

It is an object of the present invention to provide a locking clip assembly that is easily and quickly attached or removed. It is another object of the present invention to provide a locking clip assembly that is economical to manufacture. It is a further object of the present invention to provide a locking clip assembly that provides good grip and structural strength without compromising the integrity of the gripped article.

The present invention achieves these and other objectives by providing a locking clip assembly with an arm member pivotally connected to a clip body and a locking mechanism that engages and disengages the pivotable arm member between a locked position and an unlocked position.

In one embodiment of the present invention, the locking clip assembly includes a clip body, an elongated arm member and a locking member slidably disposed on the clip body for interaction with the elongated arm member. The clip body has a body clamping end, a rear portion and a body hinge portion between the body clamping end and the rear portion. The elongated arm member has a jaw portion, a lever arm portion and an arm hinge portion between the jaw portion and the lever arm portion. The arm hinge portion is pivotally connected to the body hinge portion of the clip body. The jaw portion aligns with and operatively engages and disengages from the body clamping end of the clip body. The locking member is slidably disposed on the rear portion of the clip body and is movable between an arm member locked position adjacent the body hinge portion and an arm member unlocked position spaced from the body hinge portion.

In another embodiment of the present invention, the body clamping end is a resilient tongue member. The tongue member extends away from the body hinge portion a predefined distance sufficient for the tongue member to operatively engage and disengage with the jaw portion of the arm member.

In another embodiment of the present invention, the rear portion of the clip body includes a channel within the rear portion for accommodating the lever arm portion of the arm member when the arm member is pivoted to an open position.

In still another embodiment of the present invention, the locking clip assembly includes a loop member directly connected to the rear portion of the clip body. The loop member has a loop proximal end, which is directly connected to the rear portion, and a loop distal end, which is configured for receiving a lanyard, cord and the like. In another embodiment, the loop member has an opening disposed through the loop distal end for receiving the lanyard, cord and the like. In still another embodiment, the loop member swivels around the longitudinal axis of the rear portion of the clip body.

In yet another embodiment of the present invention, the body clamping end of the locking clip assembly includes a resilient tongue member. The tongue member has a tongue proximal end connected to and adjacent the body hinge hub portion and a tongue distal end spaced a predefined distance from the body hinge hub portion. The tongue distal end operatively engages and disengages with the jaw portion of the arm member. The arm member pivots between a tongue engaging position and an open position. When the arm member is in the full open position, the open position defines a distance between the jaw portion and the tongue distal end of about 0.69-0.7 inches in the preferred embodiment but may be smaller or larger depending on the size of the clip assembly.

In a further embodiment of the present invention, the clamping body end includes a body clamping wall spaced from and extending longitudinally around the tongue member and the tongue distal end. The tongue distal end is configured to deflect when operatively engaged by the jaw portion of the arm member. The deflection amount is typically sufficient to permit locking of the arm member by the slidable locking member. The tongue distal end is deflectable in a range of about 0 inches to about one-eighth (0.125) inches in the preferred embodiment but may have a larger or smaller deflection depending on the material used and the dimensions of the tongue member.

In another embodiment of the present invention, the jaw portion includes an arm body, a jaw member and an elbow portion. The elbow portion directly connects the jaw member to the arm body and positions the jaw member in a transverse orientation to the arm body as well as to the tongue member. In a further embodiment, the elbow portion has a thickness such that the jaw portion is capable of resiliently disengaging with the tongue distal end by bending outwardly away from the body hinge portion. This may occur when an outward, transverse pressure of sufficient force engages the jaw member of the jaw portion to cause the jaw member to temporarily disengage with the tongue distal end thereby releasing a captured article. This would be important with an item such as a tool lanyard becomes entangled with the locking clip assembly where, for safety reasons, it is prudent for the locking clip assembly to forcibly release from the captured article. In yet another embodiment, the jaw portion has a jaw shoulder that engages the body clamping wall to limit the maximum deflection of the tongue distal end when engaged by the jaw portion. The advantage of such an arrangement minimizes the risk of developing stress fractures in the tongue member, which may cause premature failure of the tongue member when in the locked position.

In still another embodiment of the present invention, the lever arm portion of the arm member has a locking recess or surface on a side of the lever arm portion that is in opposed relationship to the rear portion.

In yet another embodiment of the present invention, the lever arm portion of the arm member has a second locking surface adjacent the locking recess/surface on the side of the lever arm portion that is in opposed relationship to the rear portion.

In a further embodiment, the locking member has a top surface with a locking catch. The locking catch operatively engages and disengages with a locking recess of the lever arm portion to selectively position the arm member in a locked position or an unlocked position. The locking catch may be a discreet catch, a plurality of individual catches, a locking rib or other surface that lockingly engages with the locking recess of the lever arm portion or, alternatively, with a locking surface of the lever arm portion. In yet another embodiment, the locking member surrounds the rear portion of the clip body. The shape of the locking member will have a shape to accommodate the cross-sectional shape of the rear portion of the clip body. For example, it is preferred that if the rear portion has a square cross-section, then the cross-sectional shape of the inside surface of the locking member would preferably be square also. This would also be similarly applied if the cross-sectional shape of the rear portion were rectangular, circular, elliptical, hexagonal, etc. where the cross-section shape of the inside surface of the locking member would preferably be of a similar shape.

In another embodiment of the present invention, the jaw portion of the arm member deflects the body clamping end a predefined distance when the locking member in the arm member locked position. Particularly, the jaw member contacts and deflects the tongue member a predefined distance such that the tongue member imparts a biasing pressure against the arm member that is translated to the lever arm portion to exert a downward pressure onto the locking catch of the locking member. It is this constant downward pressure transmitted from the biasing pressure of the tongue member that maintains the arm member and the locking member in a locked position without the use of helical springs in a biasing arrangement between the arm member and the clip body.

BRIEF DESCRIPTION OF THE DRAWINGS

FIG. 6 is a front view of the embodiment shown in FIG. 1.

FIG. 7 is a rear view of the embodiment shown in FIG. 1.

FIG. 8 is a perspective view of the embodiment shown in FIG. 1 showing the clip assembly in an open, unlocked position.

FIG. 9 is a side view of the embodiment shown in FIG. 8.

FIG. 10 is a bottom, perspective, front view of the embodiment shown in FIG. 1.

FIG. 11 is a rear, perspective view of the embodiment shown in FIG. 1.

DETAILED DESCRIPTION OF THE PREFERRED EMBODIMENT

Figure 1:
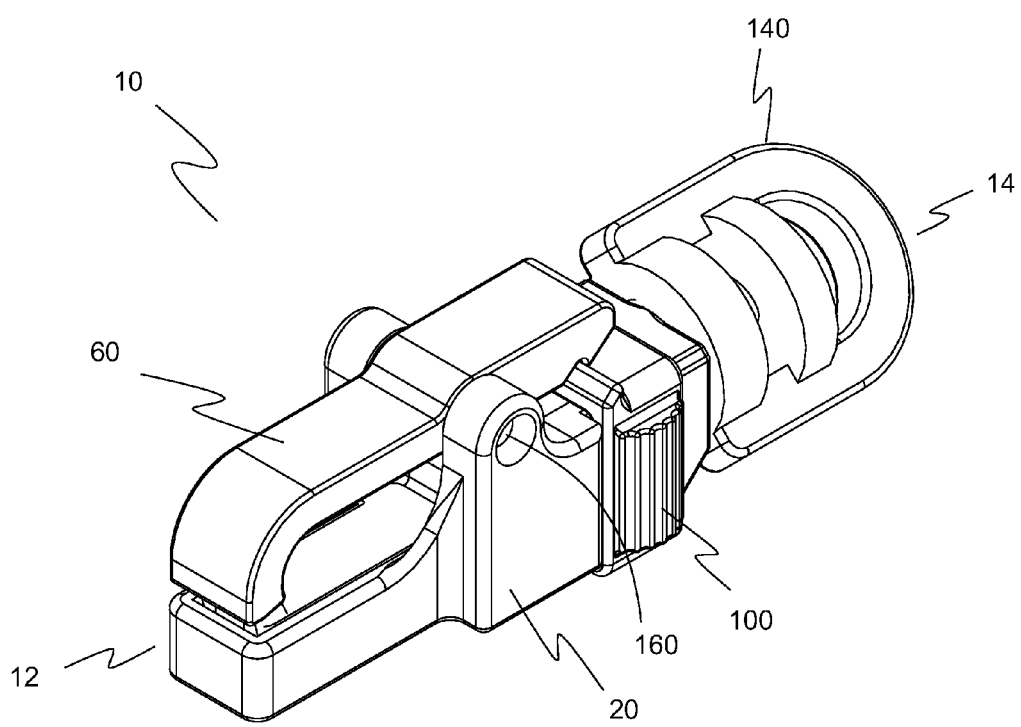
FIG. 1 is a front, perspective view of one embodiment of the present invention showing the locking clip assembly.

The preferred embodiments of the present invention are illustrated in FIGS. 1-14. FIG. 1 shows one embodiment of the locking clip assembly 10 of the present invention. Locking clip assembly 10 includes a front clip end 12, a rear clip end 14, a clip body 20, an elongated arm member 60, a locking member 100, and a loop member 140. Locking member 100 is slidably disposed on clip body 20 and is shown in a position relative to arm member 60 that prevents arm member 60 from being leveraged into an open position. Arm member 60 is pivotally attached to clip body 20 by a hinge pin 160.

Figure 2:
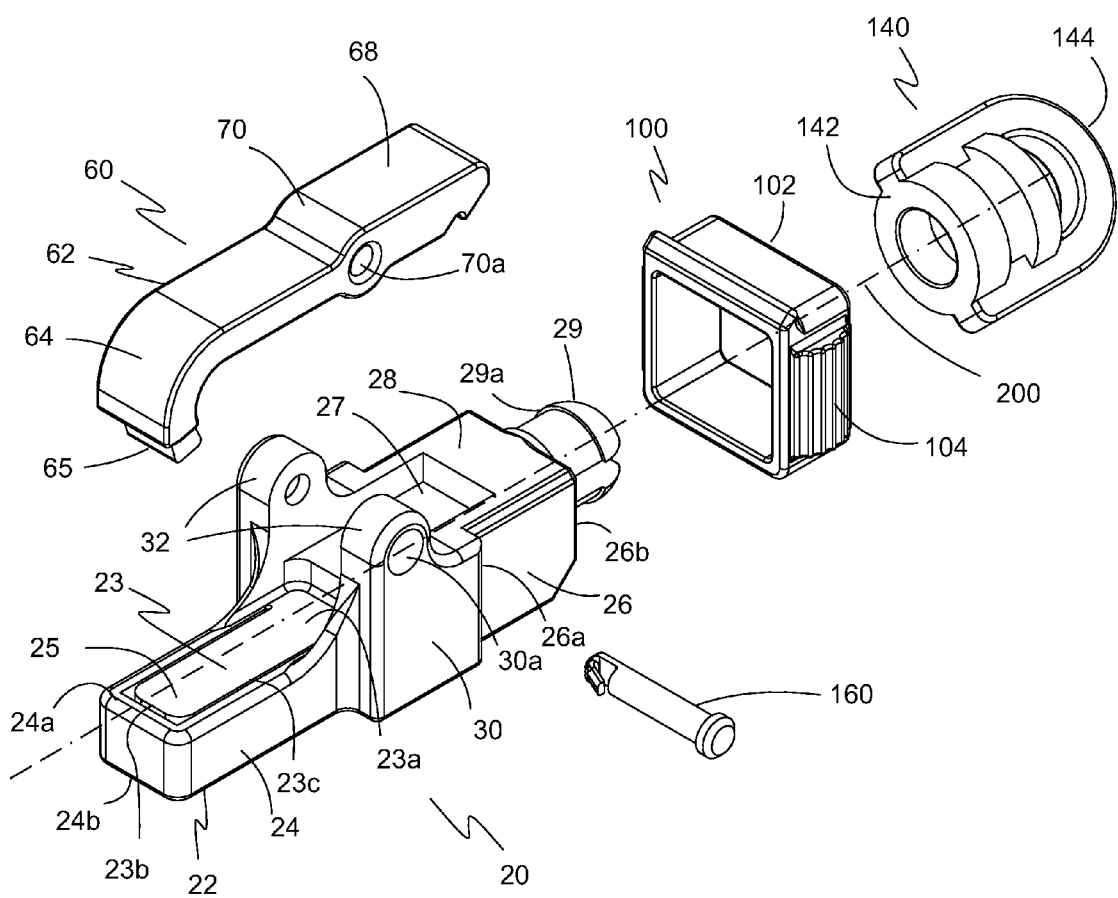
FIG. 2 is an exploded, perspective view of the embodiment shown in FIG. 1 showing the various components of the locking clip assembly.

FIG. 2 shows the components of locking clip assembly 10 in an exploded view. Clip body 20 includes a body clamping end 22, a rear portion 26 with a longitudinal axis 200 extending parallel with body clamping end 22, and a body hinge portion 30 between body clamping end 22 and rear portion 26. Body hinge portion 30 has an opening 30a therethrough for receiving the hinge pin 160.

Body clamping end 22 further includes a resilient tongue member 23 and an optional clamping body wall 24. Resilient tongue member 23 is attached at a tongue proximal end 23a to body hinge portion 30 and extends from body hinge portion 30 a predefined distance to a tongue distal end 23b. The length of tongue member 23 is determined by the size and length of elongated arm member 60. Clamping body wall 24 is attached to body hinge portion 30 and extends longitudinally along and spaced from the sides 23c of tongue member 23 and around tongue distal end 23b. Clamping body wall 24 has a top edge 24a that is preferably parallel and aligned with an upper surface 25 of tongue 23. A bottom edge 24b may or may not extend below a lower surface 25a (not shown) of tongue 23.

Rear portion 26 includes a rear portion proximal end 26a integrally connected to body hinge portion 30, a rear portion distal end 26b, and a channel 27 disposed within a portion of a top surface 28. Rear portion distal end 26b has a retaining structure 29 adapted for connecting to loop member 140. Retaining structure 29 includes a lip surface 29a to capture and retain loop member 140 onto retaining structure 29. Channel 27 is located in top surface 28 and has a depth sufficient to accommodate lever arm portion 68 of arm member 60 when arm member 60 is pivoted to an open position. It is understood that the depth of channel 27 is selected based on the desired size of the opening defined between arm member 60 and body clamp end 22 when arm member 60 is in the open position.

Arm member 60 includes a jaw portion 62, a lever arm portion 68 and an arm hinge portion 70 between jaw portion 62 and lever arm portion 68. Arm hinge portion 70 is pivotally connected to body hinge portion 30. Specifically, arm hinge portion 70 includes an arm opening 70a for receiving a hinge pin 160 around which arm member 60 rotates. As can be seen in FIG. 1, jaw portion 62 aligns with and operatively engages and disengages from body clamping end 22 and, more particularly, from resilient tongue member 23. Locking member 100 is slidably connected to rear portion 26 and includes a locking member body 102 with a raised surface portion 104 to facilitate sliding movement of locking member 100 by a user. Loop member 140 has a loop proximal end 142 and a loop distal end 144. Loop proximal end 142 attaches to retaining structure 29 of rear portion 26 while lip surface 29a of retaining structure 29 prevents loop member 140 from inadvertently becoming detached from retainer structure 29 under normal use. Preferably, loop member 140 swivels about retaining structure 29.

Because body hinge portion 30 and arm hinge portion 70 may see elevated stresses due to the high clamping loads, body hinge portion 30 and arm hinge portion 70 are fitted with body hinge hubs 32 and an arm hinge hub 72 for reinforcement. In the preferred embodiment, the hinge hubs 32, 72 are cylindrical distensions concentrically located about the openings 30a, 70a. Other hub reinforcement shapes, however, may be used or they may be eliminated entirely if adequate strength can be achieved without them. In addition, the hinge hub 32 may be widened along the axial direction of hinge pin 160 so as to be nearly as wide as the arm member 60. The flat faces of the hubs 32, 72 would then provide the pivot contact surface for hinged operation. Although a pair of body hinge hubs 32 is illustrated, it should be understood that clip body 22 may incorporate a single body hinge hub 32 for rotatable engagement with arm member 60.

The length of the jaw portion 62 and tongue member 23 determines the amount of leveraged force that can be applied to jaw member 65 and tongue distal end 23b and consequently the amount of grip strength achieved. To provide a predefined grip strength while preserving compactness, the jaw portion 62 and the tongue member 23 of the preferred embodiment are approximately 0.75 inches and approximately 0.63 inches long, respectively. To achieve additional grip strength, jaw portion 62 and tongue member 23 may be lengthened, or, to minimize size for compact applications, they may be shortened. As discussed previously, maintaining appropriate relative bending compliance of the tongue member 23 is necessary to properly operate the locking member 100 and to allow securement of clip assembly 10 to an attachment element. The cross-sectional dimensions of jaw portion 62 and tongue member 23 combined with their length and the material from which they are made regulates this relative bending compliance. It is noted that the above dimensions may be varied to accommodate variations in length and material properties, or to achieve different interim locking pressures or securement pressures.

Although any of the various components comprising the clip body 20 and the arm member 60 could be fabricated as an individual part and joined to the assembly by appropriate means, it is generally preferable that the clip body 20 and the arm member 60 each be formed as a single integral part incorporating the associated sub-components. This may be accomplished by injection molding the clip body 20 and the arm member 60 of suitable plastic such that the entire locking clip assembly 10 requires only three or four parts, the clip body 20, the arm member 60, the locking member 100, and, in some embodiments, the hinge pin 160. This arrangement is highly advantageous from the standpoint of simplicity, economy of manufacture, and durability. Polyoxymethylene (POM), also known as acetal, polyacetal and polyformaldehyde, is particularly suitable for use in the present invention due to its combination of strength and resiliency, however, other materials such as, but not limited to, glass-fiber filled nylon, ABS, other plastics, metal, or composites may also be used so fabricate clip body 20 and arm member 60 so long as they provide the appropriate amount of strength, resilience and relative compliance for the intended functionality. Additionally, other molding, machining, or manufacturing processes may be employed as well. The hinge pin may be fabricated from metal, plastic, or some other material; or it may be eliminated completely and formed as a subcomponent of either the clip body 20 or the arm member 60.

Figure 3:
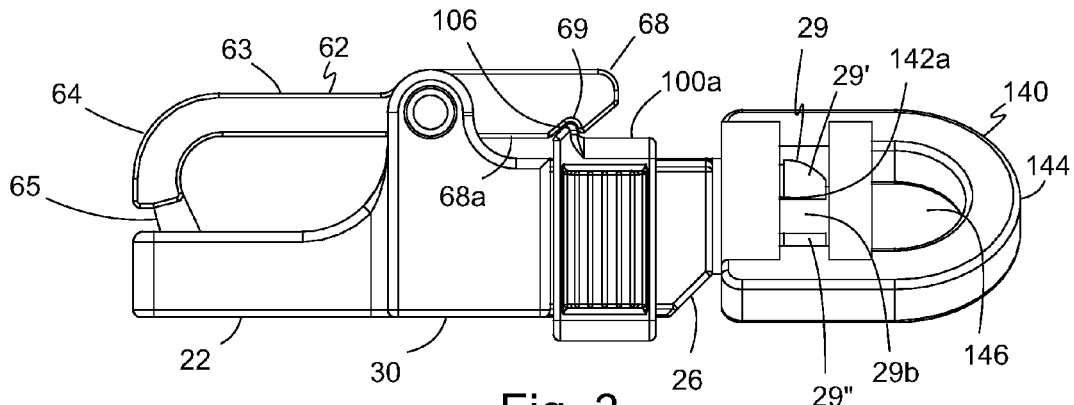
FIG. 3 is a side view of the embodiment shown in FIG. 1 showing the arm member in a locked position.

Turning now to FIG. 3, there is a side view of locking clip assembly 10 of FIG. 1. As illustrated, arm member 60 includes a locking recess 69 in a lower surface 68a that is in opposed orientation to rear portion 26. Locking member 100 has a locking member surface 100a that includes a locking catch 106. Locking catch 106 is sized to be received by and to operatively engage and disengage with locking recess 69 of lever arm portion 68 to selectively position arm member 60 in a locked position as shown or in an unlocked position. Jaw portion 62 includes an arm body 63, an elbow portion 64 and a jaw member 65. Arm body 63 extends away from arm hinge portion 70 in an opposite direction from lever arm portion 68 and connects to elbow portion 64, which extends in a transverse orientation from arm body 63 towards clip attachment end 22. Elbow portion 64 terminates by directly connecting to jaw member 65.

In this view, the preferred connection of loop member 140 to rear portion distal end 26b is more clearly shown. Retaining structure 29 has a channel or slot 29b incorporated preferably along a central portion of retaining structure 29 for a predefined distance towards rear portion 26 forming a first retaining structure portion 29' and a second retaining structure portion 29". The predefined distance is sufficient to permit squeezing first retaining structure portion 29' and second retaining structure portion 29" together when attaching loop member 140 thereto. Once loop member 140 is attached, first retaining structure portion 29' and second retaining structure portion 29" return to their original orientation. Lip surface 29a of retaining structure 29 prevents loop member 140 from being easily removed by interacting with an inside proximal end surface 142a in a catch-type relationship. As can be seen, loop distal end 144 has a loop through opening 146 configured for attaching to a lanyard, cord, and the like.

Figure 4:
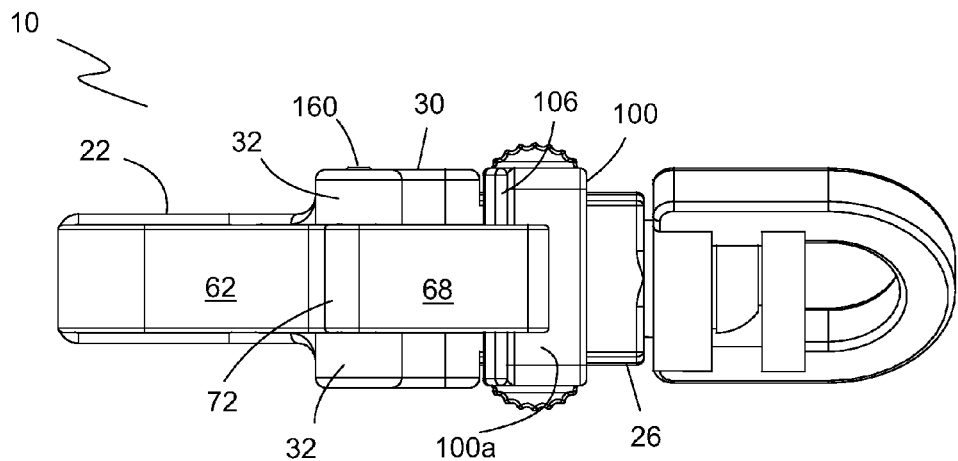
FIG. 4 is a top view of the embodiment shown in FIG. 1.

FIG. 4 is a top view of locking clip assembly 10. Arm member 60 has arm hinge hub 72 aligned with body hinge hubs 32 and hinge pin 160 rotatably connecting arm member 60 to hinge hub portion 30 of clip body 20. As shown, lever arm portion 68 extends over rear portion 26 while jaw portion 62 extends over body clamping end 22. Locking member 100 is in the arm locked position where locking catch 106 of locking member surface 100a is engaged with locking recess 69 (not shown) where locking member 100 is adjacent body hinge hub portion 30.

Figure 5:
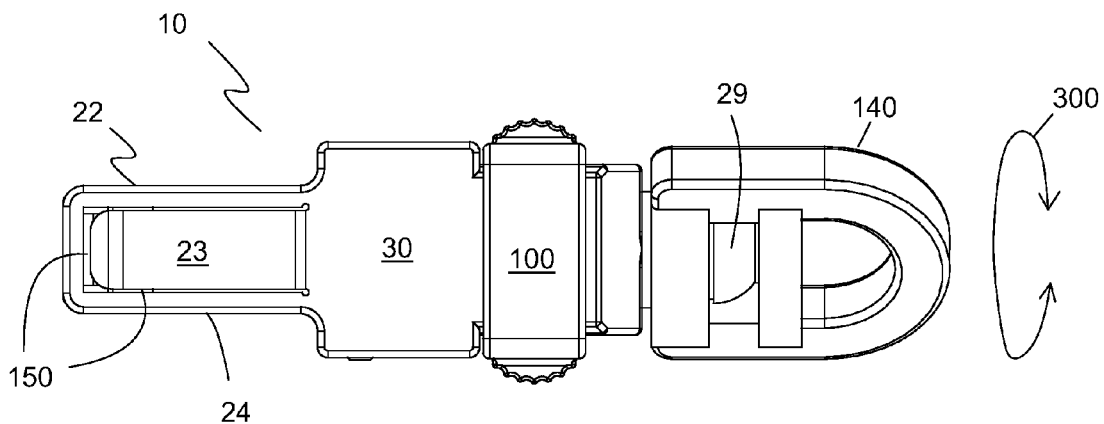
FIG. 5 is a bottom view of the embodiment shown in FIG. 1.

Turning now to FIG. 5, there is illustrated a bottom view of locking clip assembly 10. This view more clearly shows body clamping end 22. As can be seen, body clamping end 22 includes a tongue member 23 surrounded by clamping body wall 24. Tongue member 23 and clamping body wall 24 define a tongue-wall space 150 that permits tongue 23 to bend independently from clamping body wall 24. Clamping body wall 24 provides protection against an inadvertent release of an item or article captured between jaw member 64 and tongue member 23 or behind jaw member 65. Clamping body wall 24 is such that it prevents lateral intrusion to upper surface 25 of tongue 23, which is also known as the clamping surface. Although loop member 140 may be in a fixed, non-rotatable position, it is preferable that loop member 140 freely rotate around retaining structure 29 as indicated by arrow 300.

FIGS. 6 and 7 illustrate a front view and a rear view of locking clip assembly 10. FIG. 6 shows arm member 60 in a locked position with elbow portion 64 and jaw member 65 extending to and contacting tongue member 23 (not shown) but protected by a wall end portion 24'. From this view, it is seen that locking member 100 cannot go past body hub portion 30 since body hub portion 30 due to its configuration prevents locking member 100 from sliding over body clamping end 22. FIG. 7 illustrates the size relationship of loop member 140 to locking member 100. Loop member 140 is sufficiently large to prevent locking member 100 from sliding off of rear portion 26 by way of rear portion distal end 26b.

Turning now to FIGS. 8 and 9, there is illustrated a perspective view and a side view of locking clip assembly 10, respectively, in an open orientation and an unlocked position. Locking member 100 is positioned adjacent rear portion distal end 26b (hidden by member 100) and loop member 140, which allows arm member 60 to pivot about hinge pin 160. The position of locking member 100 and the inclusion of channel 27 in top surface 28 provides the space required to accommodate lever arm portion 68 to move into channel 27 while simultaneously opening and moving jaw portion 62 away from clip attachment end 22. The depth of channel 27 determines the angle of inclination of arm member 60 relative to clip body 20 and the size of the space between jaw member 65 and tongue member 23.

FIG. 10 illustrates a bottom, front perspective view of locking clip assembly 10. In this view, arm member 60 and locking member 100 are in an arm member locked position. Tongue 23 appears to be recessed from bottom edge 24b since clamping body wall 24 extends beyond lower surface 25a of tongue member 23. FIG. 11 illustrates a top, rear perspective view of locking clip assembly 10. Arm member 60 and locking member 100 are in an arm member locked position as seen by the locking member catch 106 received in lever arm recess 69. Jaw member 65 is contacting tongue member 23, which prevents arm member 60 from pivoting/rotating about hinge pin 160 and thereby causing recess 69 of lever arm portion 68 to move out of engagement with locking member catch 106. Because arm member 60 freely rotates/pivots about hinge pin 160, tongue member 23 provides the biasing pressure (i.e. spring action) required to maintain both arm member 60 and locking member 100 in position when in a locked orientation. This is more clearly shown in FIGS. 12 and 13.

Figure 12:
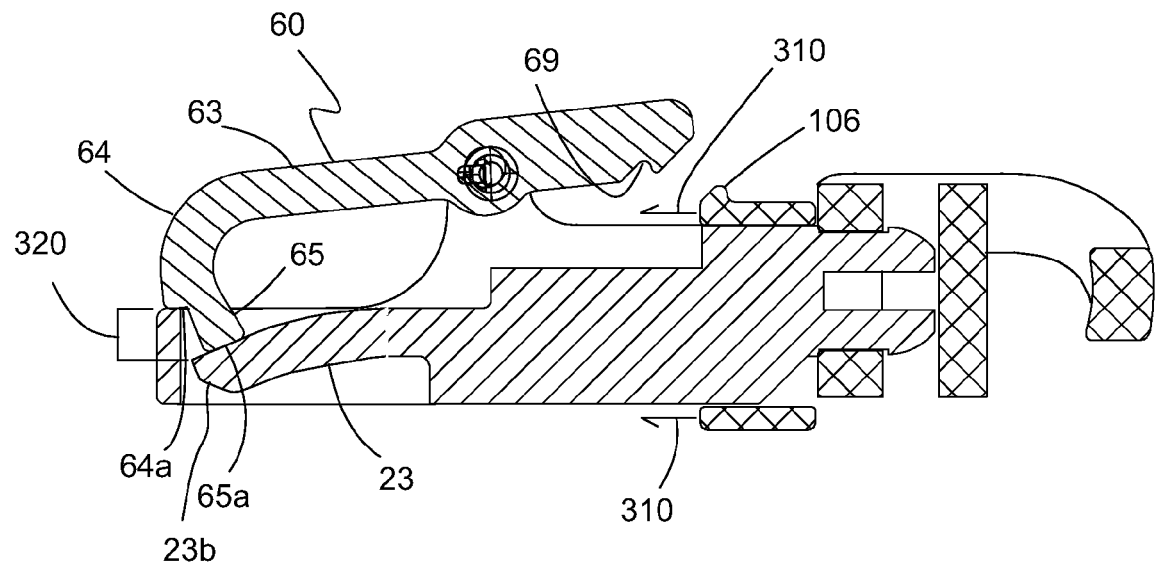
FIG. 12 is a partial, cross-sectional view of the embodiment of FIG. 1 showing the deflection of the tongue by the arm member to move the locking member into the arm locked position.

Turning now to FIG. 12, there is illustrated a cross-sectional view of the interaction of arm member 60 and tongue member 23 when moving locking member 100 as indicated by arrows 310 into a locked position. As described previously, tongue member 23 is made of a resilient material and has length to thickness ratio to provide some limited bendability of tongue member 23 while simultaneously providing a predefined biasing pressure against jaw member 65 when forced into a bent position by arm member 60. To move locking member 100 into a locking orientation with lever arm portion 68 of arm member 60, a user pushes (i.e. applies pressure to) jaw portion 62 downward against tongue member 23 and bends tongue member 23 a sufficient amount indicated by reference number 320 to permit locking catch 106 of locking member 100 to slide under lever arm portion 68 into position so that locking catch 102 is aligned for engaging arm recess 69. A typical deflection required of tongue distal end 23b is in a range of about 0.1 to about 0.2 when tongue member 23 is about 0.625 inches long, about 0.23 inches wide and about 0.12 inches thick and arm member 60 has a length of about 1.4 inches. An optional but beneficial feature on arm member 60 is the configuration of jaw member 65 to elbow portion 64 and arm body 63. Jaw member 65 is sized to have a width substantially equal to the width of tongue member 23. Elbow portion and arm body 64, 63, respectively, have a larger cross-sectional area than the cross-sectional area of jaw member 65 such that an arm contact surface 64a is created and extends preferably around a major portion of the cross-sectional area of jaw member 65. Arm contact surface 64a is positioned a predefined distance from a jaw contact surface 65a of jaw member 65. The position of arm contact surface 64a provides for contact between arm contact surface 64a and top edge 24a of clamping wall 24. The predefined distance is preferably equal to the maximum deflection of tongue member 23 required to permit moving locking member 100 into the locked position with lever arm portion 68 of arm member 60. In this way, arm contact surface 64a prevents a user from over depressing and bending tongue member 23, which could cause microscopic stress fractures that would lead to premature failure of tongue member 23.

Figure 13:
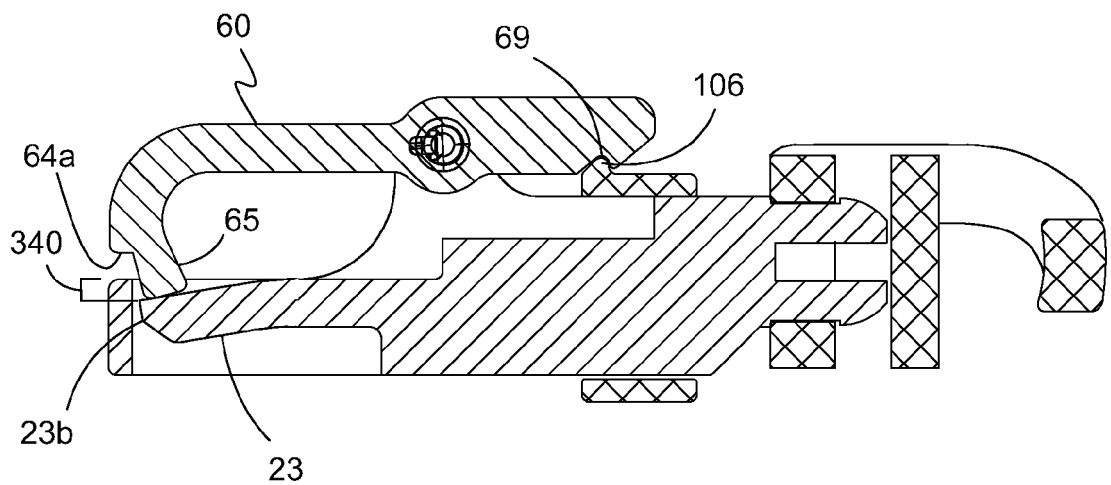
FIG. 13 is a partial, cross-sectional view of the embodiment of FIG. 1 showing deflection of the tongue by the arm member when in a locked position.

FIG. 13 illustrates a cross-sectional view of the interaction of arm member 60 and tongue member 23 when locking member 100 is in a locked position with lever arm portion 68. As illustrated, tongue member 23 is maintained in a biasing, bent orientation against jaw member 65 of arm member 60. This biasing, bent orientation is equal to about 0.05 inches as indicated by reference number 340 with respect to the dimensions of tongue member 23 and arm member 60 described above. In this locked position orientation, the biasing pressure provided by tongue member 23 against jaw member 65 transmits a downward bias pressure to lever arm portion 68 such that arm recess 69 and locking catch 106 are maintained in a locked position. This locked position is maintained until a user physically imparts a downward pressure onto arm body 63 to change the inclination of arm member 60 to a position represented in FIG. 12 thereby releasing the locking catch 106 from arm recess 69 and permitting the movement of locking member 100 to an unlocked position. Locking clip assembly 10 may be made of most any material having sufficient density to maintain its form for its intended use but is preferably, entirely made of a thermoplastic material. This is particularly important in settings such as in nuclear power plants or other plant critical locations where metal or electrically conductive material could present a hazard.

Figure 14:
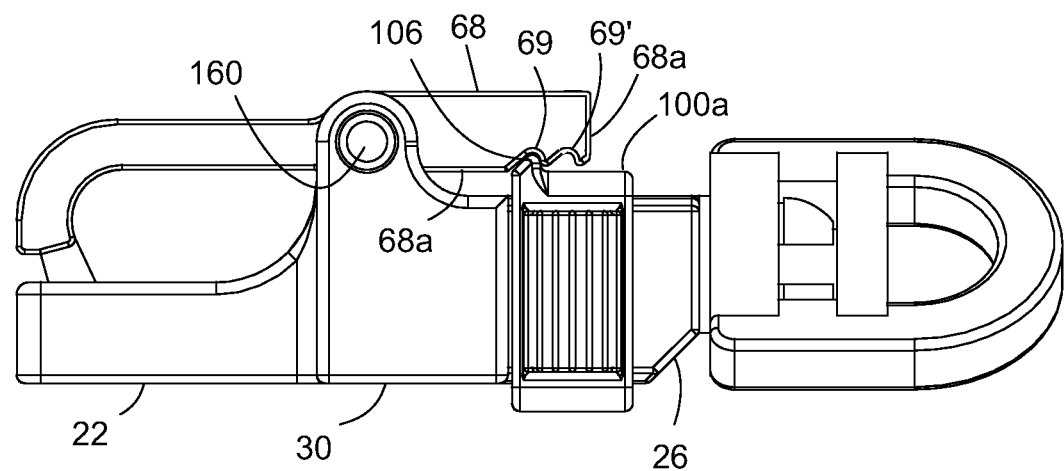
FIGS. 14 and 15 are side views of another embodiment of the present invention showing a secondary locking surface in the lever arm portion of the lever arm.
Figure 15:
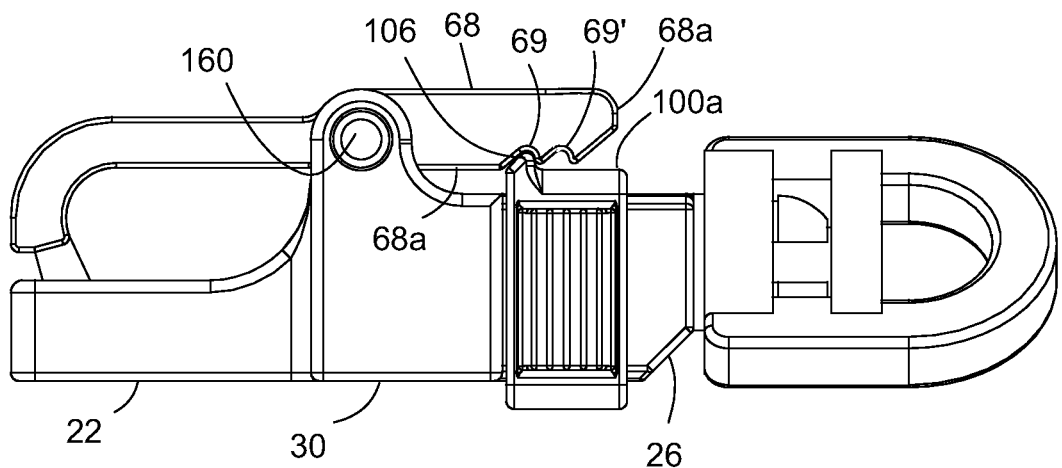

Turning now to FIGS. 14 and 15, there is a side view of locking clip assembly 10 showing another embodiment of arm member 60. In this embodiment, arm member 60 includes not only a locking recess or surface 69 in a lower surface 68a that is in opposed orientation to rear portion 26 but also a second locking recess or surface 69' adjacent locking recess/surface 69. As previously described, locking member 100 has a locking member surface 100a that includes a locking catch 106. Locking catch 106 is sized to be received by and to operatively engage and disengage with locking recess 69 of lever arm portion 68 to selectively position arm member 60 in a locked position as shown or in an unlocked position. Second locking recess 69' is optionally included in this embodiment as a safety measure. In the event that locking member 100 is inadvertently moved out of locking engagement with the primary locking recess, i.e. locking recess 69, second locking recess 69' would receive locking catch 106 and prevent a change in the status of arm member 60 from a locked position to an unlocked position.

The main difference between the embodiment of the lever arm portion 68 in FIG. 14 and FIG. 15 is the shape of the end 68a. In the embodiment shown in FIG. 15, it is contemplated that rear portion 26 and the associated channel 27 would extend a sufficient distance to accommodate the arc defined by end 68a as arm member 60 rotates about hinge pin 160 between a locked position and an unlocked position.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A locking clip assembly comprising:
a clip body having a body clamping end, a rear portion with a longitudinal axis extending parallel with the body clamping end and a body hinge portion between the body clamping end and the rear portion;
an elongated arm member having a jaw portion, a lever arm portion and an arm hinge portion between the jaw portion and the lever arm portion, the lever arm portion having a locking recess on a side of the lever arm portion and opposed to the rear portion of the clip body, wherein the arm hinge portion is pivotally connected to the body hinge portion of the clip body and wherein the jaw portion aligns with and operatively engages and disengages from the body clamping end of the clip body; and
a locking member slidably disposed on the rear portion of the clip body, the locking member having a top surface with a locking catch, the locking member selectively movable between an arm member locked position adjacent the body hinge portion wherein the locking catch operatively engages the locking recess of the lever arm portion, and an arm member unlocked position spaced from the body hinge portion wherein the locking catch is operatively disengaged from the locking recess of the lever arm portion.

2. The locking clip assembly of claim 1 wherein the body clamping end includes a resilient tongue member that extends away from the body hinge portion a predefined distance to a tongue distal end, the predefined distance sufficient for the tongue member to operatively engage and disengage with the jaw portion of the arm member.

3. The locking clip assembly of claim 2 wherein the arm member pivots between a tongue engaging position and an open position, wherein the jaw portion operatively engages the resilient tongue member when the arm member is in the tongue engaging position.

4. The locking clip assembly of claim 3 wherein the open position of the arm member defines a distance of about 0.69 inches between the jaw portion and the tongue distal end when the arm member is in a full open position.

5. The locking clip assembly of claim 2 wherein the jaw portion of the arm member extends away from the arm hinge portion a predefined distance toward the body clamping end of the clip body.

6. The locking clip assembly of claim 5 wherein the jaw portion includes an arm body, a jaw member and an elbow portion directly connecting the jaw member to the arm body.

7. The locking clip assembly of claim 6 wherein the elbow portion has a thickness wherein the jaw portion is capable of resiliently disengaging with the tongue distal end by bending outwardly sufficient to release a captured article when an outward, transverse pressure of sufficient force engages the jaw portion causing the jaw portion to temporarily disengage with the tongue distal end.

8. The locking clip assembly of claim 1 wherein the rear portion of the clip body includes a channel extending along the rear portion a predefined distance sufficient to accommodate the lever arm portion of the arm member when the arm member is pivoted to an open position.

9. The locking clip assembly of claim 1 further comprising a loop member with a loop proximal end and a loop distal end wherein the loop proximal end is directly connected to the rear portion of the clip body.

10. The locking clip assembly of claim 9 wherein the loop member has an opening disposed through the loop distal end.

11. The locking clip assembly of claim 9 wherein the loop member swivels around the longitudinal axis of the rear portion of the clip body.

12. The locking clip assembly of claim 1 wherein the body clamping end includes a resilient tongue member extending from a tongue proximal end adjacent the body hinge portion to a tongue distal end so as to operatively engage and disengage with the jaw portion of the arm member.

13. The locking clip assembly of claim 12 wherein the tongue distal end is adapted to deflect when operatively engaged by the jaw portion of the arm member sufficient to permit locking of the arm member by the slidable locking member.

14. The locking clip assembly of claim 13 wherein the tongue distal end is deflectable in a range of greater than 0 inches and up to 0.125 inches.

15. The locking clip assembly of claim 1 wherein the jaw portion deflects the body clamping end a predefined distance when the locking member is in the arm member locked position.

16. A locking clip assembly comprising:
a clip body having a body clamping end, a rear portion with a longitudinal axis extending parallel with the body clamping end and a body hinge portion between the body clamping end and the rear portion;
an elongated arm member having a jaw portion, a lever arm portion and an arm hinge portion between the jaw portion and the lever arm portion wherein the arm hinge portion is pivotally connected to the body hinge portion of the clip body and wherein the jaw portion aligns with and operatively engages and disengages from the body clamping end of the clip body; and a locking member slidably disposed on the rear portion of the clip body and movable between an arm member locked position adjacent the body hinge portion and an arm member unlocked position spaced from the body hinge portion;

wherein the body clamping end includes a resilient tongue member extending from a tongue proximal end adjacent the body hinge portion to a tongue distal end so as to operatively engage and disengage with the jaw portion of the arm member; and wherein the body clamping end includes a body clamping wall spaced from and extending longitudinally around the tongue member and the tongue distal end.

17. The locking clip assembly of claim 16 wherein the lever arm portion has a locking surface on a side of the lever arm portion opposed to the rear portion.

18. The locking clip assembly of claim 17 wherein the lever arm portion has a second locking surface adjacent the locking surface on the side of the lever arm portion opposed to the rear portion.

19. The locking clip assembly of claim 17 wherein the locking member has a top surface with a locking catch wherein the locking catch operatively engages and disengages with the locking surface of the lever arm portion of the arm member to selectively position the arm member in the locked position or the unlocked position.

20. The locking clip assembly of claim 16, wherein the jaw portion has a jaw shoulder that engages the body clamping wall, thereby limiting maximum deflection of the tongue distal end when engaged by the jaw portion.

\* \* \* \* \*